United States Patent [19]

Olsson et al.

[11] 4,043,520

[45] Aug. 23, 1977

[54] METHOD AND ARRANGEMENT FOR REGISTERED SPLICING OF A WEB OF MATERIAL WHILE IT IS IN MOTION

[75] Inventors: Willy John Olsson; Harald Georg Swede, both of Malmo, Sweden

[73] Assignee: AB Ziristor, Lund, Sweden

[21] Appl. No.: 620,403

[22] Filed: Oct. 7, 1975

[30] Foreign Application Priority Data

Oct. 11, 1974 Sweden ................................ 7412808

[51] Int. Cl.[2] ...................... B65H 19/18; B65H 21/02
[52] U.S. Cl. .................................. 242/58.1; 242/58.3
[58] Field of Search .................... 242/58.1, 58.2, 58.3, 242/58.4, 58.5

[56] References Cited

U.S. PATENT DOCUMENTS

| 2,536,153 | 1/1951 | Bishop | 242/58.3 |
|---|---|---|---|
| 2,899,143 | 8/1959 | Crosfield et al. | 242/58.3 |
| 3,198,451 | 8/1965 | Huck | 242/58.3 |
| 3,236,470 | 2/1966 | Huck et al. | 242/58.3 |

*Primary Examiner*—Stanley N. Gilreath
*Assistant Examiner*—John M. Jillions
*Attorney, Agent, or Firm*—Pierce, Scheffler & Parker

[57] ABSTRACT

A method and device for splicing a rotating new roll of material to a moving web which is nearly exhausted, each web having uniformly spaced indicia thereon and wherein the indicia on the new roll at the leading end thereof is unevenly spaced, the speed of the old web being adjusted to correspond with the peripheral speed of the new roll during a portion of its periphery and the indicia then being exactly registered along that portion so that the webs are spliced together to provide a continuing web having uniformly spaced indicia thereon.

9 Claims, 1 Drawing Figure

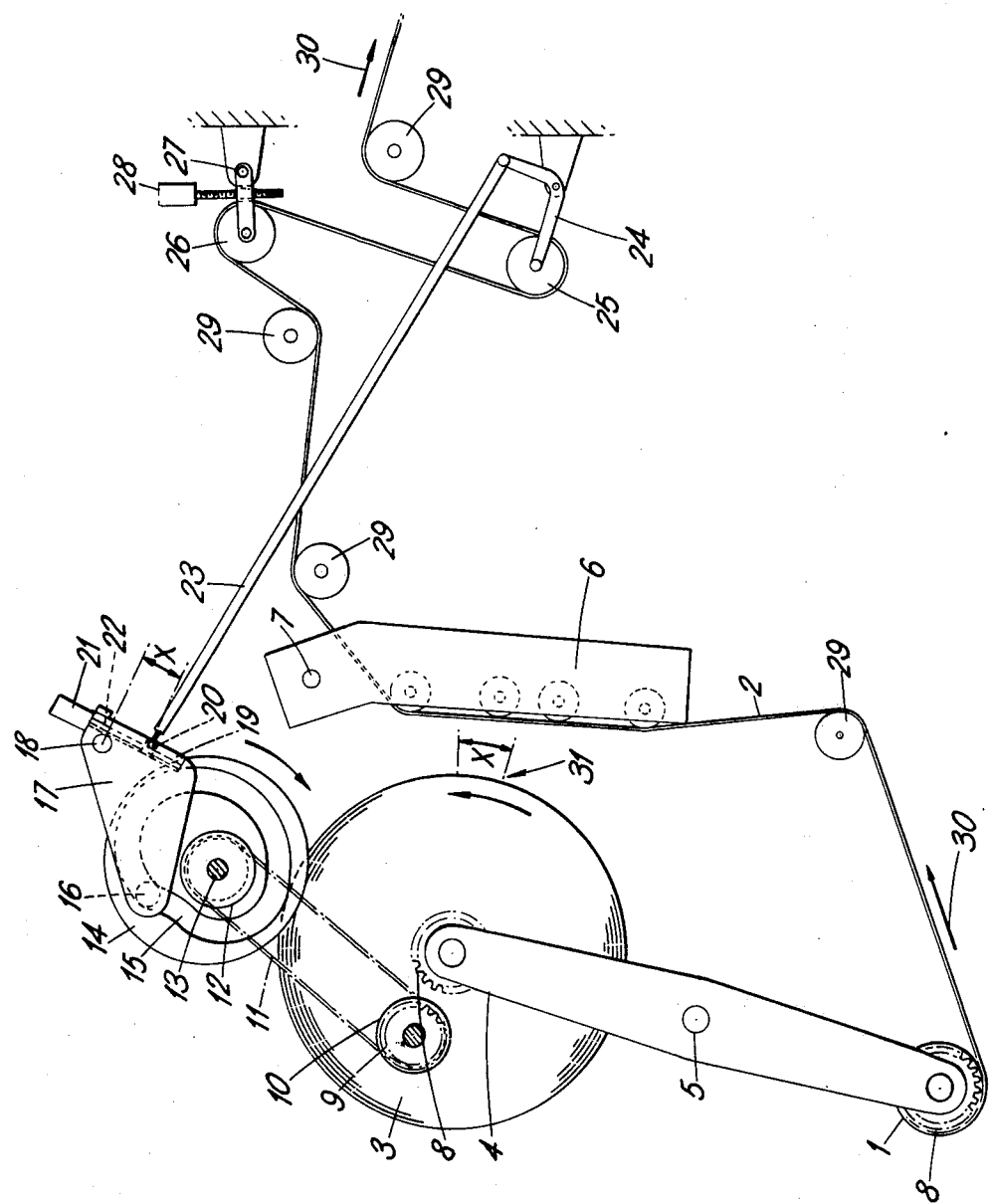

METHOD AND ARRANGEMENT FOR REGISTERED SPLICING OF A WEB OF MATERIAL WHILE IT IS IN MOTION

The present invention relates to a method of splicing a web of material moving from a roll to a processing machine and provided with a regular pattern in register with anothr web of material wound upon another roll in such a way that the peripheral length of the roll does not correspond to an integral number of pattern intervals. The invention also relates to an arrangement for carrying out this method, the said invention comprising a roll stand with holders for both the first and the second roll, an arrangement for splicing the end of the exhausted web with the first end of the new second web and driving devices to rotate the second roll at a constant speed.

During the production of modern disposable packages for liquid food, the packages are generally formed and filled in the same machine making use of a normally web-type packaging material introduced into the packaging machine in the form of a roll. When the material is introduced into the packaging machine it must already be provided with the decoration or other indicia which the completed packages are to bear. In addition, the material must be provided with crease lines enabling the package to be shaped.

A typical material of this type is a laminated material processing decorative patterns and crease lines which are repeated at equal intervals. Processing of the material takes place in several stages. To begin with a backing layer is produced, which generally consists of a fibrous material, and then the backing layer is lined with one or several laminating layers of thermoplastic material. Then the material is printed and provided with crease lines and finally it is separated into webs of the required width.

The different processing stages take place in machines which during rewinding of the material carry out the actual processing operation, e.g. lamination or printing. The machines operate continuously, and the replacement of the roll of material as well as the consequent splicing of the outgoing end of the first web of material with the starting end of the new second roll have to be effected while the machine is running, and if possible without reduction in speed. This does not cause any difficulties if the web does not bear any markings which must be brought into register with one another. In such cases splicing is effected by providing the end of the new web of material, which is being presented in the form of a roll, with a strip which is adhesive on both sides, whereupon the roll is caused to rotate in such a way as to ensure that its peripheral speed corresponds to the speed of the web passing through the first machine. When the outgoing end of the web passing through the machine approaches, the new rotating roll and the web passing through the machine are brought together and pressed against the another thus causing the webs to be joined by the splicing tape. The remaining part of the old web is then immediately detached.

If the web of material is provided with a pattern, e.g. a decorative pattern, crease lines, arrangements of apertures, etc. it is not sufficient for the peripheral speed of the new roll to merely correspond to the speed of the web passing through the machine, but the patterns on the webs must also register with one another at the moment of splicing. If this is not the case splicing causes the pattern to be displaced, and this has a harmful effect on subsequent process operations.

However, it has not been possible so far (except in exceptional cases) to splice decorated material in such a way as to match the decorations, as is necessary e.g. when the printed material has to be provided with crease lines, without stopping the web or at any rate considerably reducing the speed of the machine.

The reason for these difficulties consists in the fact that the diameter of the new roll is very rarely and only exceptionally such that the circumference of the roll corresponds to an integral number of divisions between the decoration markings, which means that even if the peripheral speed of the roll corresponds at a certain moment with the speed of the web passing through the machine and the decoration markings are in register with the decoration markings on the web passing through the machine, the said decoration markings will after one revolution of the rolls be again mutually out of register. If such decoration markings correspond during one revolution of the rolls they will during the next revolution of the rolls be displaced by an amount corresponding to the distance between the decoration markings on both sides of the end of the web of material on the new roll. These errors are cumulative and may in certain cases result in periodic coincidence of the decoration markings after a certain number of roll rotations. The above-mentioned exceptions in which splicing of printed material can take place without difficulty are of course those cases in which the diameter of the roll is such that the circumference of the roll corresponds to an integral number of pattern intervals, but this occurs only irregularly and very rarely.

In order to enable registered splicing without reduction in the speed of the machine it is necessary for the regularly repeated pattern to coincide periodically, if possible, once during operation of each roll rotation, with the pattern of the passing web.

One object of the present invention consists in designing a method which eliminates the above disadvantages and enables splicing in register of a web of material passing through the machine and a web of material presented in the form of a new roll.

A further object of the present invention consists in bringing about a method which enables splicing in register of a web of material passing through the machine without the speed of the new web of material being significantly altered.

A further objective of the present invention consists in bringing about an arrangement for putting this method into practice.

A further object of the present invention consists in bringing about a method and an arrangement for splicing in register of a web of material passing through the machine, the said method and the said arrangement enabling the application of known splicing apparatus.

These and other objects have been achieved according to the invention by a method of the type described above, characterized in that the pattern on the old web passing through the machine is brought into exact register with the pattern of the new roll which is rotating at an even speed, for at least part of each roll revolution, by momentarily changing the speed of the old web, whereupon the webs are spliced in a known manner.

An arrangement for putting the method in accordance with the invention into practice is characterized by the fact that it comprises devices for momentarily changing the speed of the web passing through the machine during each revolution of the new roll of material so that the old web moves, during part of each revolution of the other roll, at a speed corresponding to the peripheral speed of the new roll, as well as devices to bring the pattern of the old web passing through the machine into exact register with the other web on the new roll of material.

The preferred embodiments of the method and the arrangement in accordance with the invention are outlined hereinafter.

The invention is described in greater detail below with reference to the attached schematic drawing showing an arrangement for carrying out the method in accordance with the invention.

The arrangement shown, with the aid of which a web of material 2 passing from a first roll 1 is spliced in register with another web of material presented in the form of a roll 3, comprises a number of conventional parts. Such parts, which are in principle of the same design as are at present used for splicing unpatterned webs of material under similar conditions, are e.g. a roll stand 4, which supports the rolls 1 and 3 and is rotatably supported so as to pivot around a pivoting center 5, a splicing arrangement 6, which can be rotated about point 7 and is so designed as to press, at the moment of splicing, the web 2 which passes through the machine against the periphery of the new roll 3. According to the invention the two rolls of material 1 and 3 are supported by shafts, each end of which is supported by the roll stand 4 in such a manner as to make the said shafts rotatable. Each shaft is firmly linked with a gearwheel 8, which, when roll 1 or 3 is in an upper position in respect of the rotary position of roll stand 4, can be engaged with a drive 9 to rotate it (roll 3 in the position shown in the drawing). Drive 9 is mounted on the same shaft as a belt pulley 10 which is linked with another belt pulley 12 by means of a serrated belt 11, the said belt pulley 12 being mounted on a driving shaft 13. The driving device comprising drive 9, belt pulley 10 and serrated belt 11 is supported by an arm (not shown) which is supported for rotation about the center of driving shaft 13 between a first position, in which drive 9 engages the gearwheel 8 and another position in which drive 9 does not engage the gearwheel 8 as shown in the FIGURE.

The driving shaft 13 consisting of the output shaft from a gearbox supports, in addition to the belt pulley 12, also a cam disc 14 which is provided with a cam in the shape of a track 15. The track 15 has (for reasons which will be explained in detail below) a constant rise for about half a revolution. Before and after the rise there is an acceleration stretch and a retardation stretch, respectively, while the remaining part of the revolution is covered by a track section with a small radius. Both the belt pulley 12 and the cam disc 14 are rigidly connected with the driving shaft 13 and are thus incapable of rotating with respect to one another. Along cam track 15 runs a follower roll 16, which is supported by a follower unit 17 pivotally mounted on a shaft 18. The follower unit 17 in principle constitutes an angle lever mounted on shaft 18, the end of one leg of which supports the follower roll 16. The other leg of the lever is provided with a longitudinal track 19 along which a link carrier 20 can be displaced to and fro by means of an adjusting screw 22 which can be rotated by a regulating motor 21. A link rod 23 has one end connected with one leg of the angular lever 24. The other leg of the angular lever 24 supports a shaft with a freely rotatable roller 25 over which passes the web 2.

The drawing also shows a freely rotatable roller 26 which is supported by two levers which can be rotated about a shaft 27. The reference number 28 indicates an electrical motor for swinging the roller 26 about the shaft 27. The drawing also shows a number of rollers 29 which guide the web as it passes through the machine. Both the guide rollers 29 and the other devices shown in the drawing are supported on a fixed frame, which for the sake of clarity has been omitted from the schematic drawing.

The splicing arrangement 6 shown in the drawing is a conventional device consisting of parallel frame halves between which a number of rolls are supported so as to be freely rotatable. The splicing arrangement 6 can be rotated about shaft 7 between the illustrated, inactive position, at a distance from roll 3 and an active position in which the splicing arrangement is near roll 3 and can be so controlled as to press web 2 which passes through the machine against the periphery of roll 3. The splicing arrangement can be controlled by means of an electric motor or a similar device.

The driving device comprising drive 9 can also be swung to and fro between an active and an inactive position as stated above. The pivoting center corresponds with the center of the driving shaft 13. In the shown inactive position, the driving device is entirely disengaged from roll 3. In conjunction with the splicing operation drive 9 is caused to engage gearwheel 8 of roll 3 and thus connects the driven roll 3 with the drive shaft 13. When the drive shaft 13 is rotated (by means of an electric motor not shown) it not only drives roll 3 synchronously with the latter but also the cam disc 14 mounted on the driving shaft, the said cam disc being in turn connected with the follower device 17 so as to impart a to and fro movement to the latter. This movement is transmitted via the link rod 23 to roller 25, which is thus caused to move to and fro in step with the rotation of roll 3.

When the machine (e.g. a printing press) which is provided immediately following the splicing arrangement in accordance with the invention, operates it continuously draws the web of material 2 from the first roll 1. The web of material moves in the direction indicated by arrow 30 and is guided by rollers 29 along a certain path past the splicing arrangement 6 and the freely rotatable, radially displaceable rollers 25 and 26. During this stage of the process both the splicing arrangement 6 and drive 9 remain in the inactive position as shown in the drawing. This normal unwinding process goes on until the web of material belonging to the outgoing first roll 1 begins to approach its end when preparations for splicing of the trailing end of the web of material 2, which passes through the machine, and the leading end of the web of material on the unused other roll 3 are made.

The new roll 3 is prepared for splicing by cutting its end at right angles to the longitudinal direction of the web of material and providing it with a strip of splicing tape. The new end of the web of material is indicated by the reference number 31. If the web of material is provided with special spaced registration marks it is cut through such a mark, or through a pattern or decoration marking. The distance X between the first decoration or registration marking and the last visible decoration or registration marking on the roll is measured. This distance X is then transferred to the follower device 17, where the corresponding distance is set between the center of shaft 18 and the center of link carrier 20 as shown in the FIGURE. This is done by means of the regulating motor 21, which turns the screw 22 to displace the link carrier 20 in groove 19. By adjusting the link carrier 20 to be set at the same distance from the center of shaft 18 as the distance X on the roll 3 the construction prossesses those geometrric dimensions so that the center shaft of roller 25 will be displaced radially by a distance corresponding to the distance X when the cam disc 14 rotates. Following the adjustment of link carrier 20, the splicing arrangement 6 is moved to its active position and the end 31 of roll 3 is aligned with a marking on the splicing arrangement, which is intended for this purpose. The necessary adjustment is effected by turning roll 3, whereafter the driving device is titled downward, so that drive 9 engages gear 8. At this stage the cam disc 14 must be so positioned that the follower roll 16 is closest to the center of shaft 13. This is normally the case since the cam disc returns to that position after each splicing operation. Then the motor which drives the driving shaft 13 is started, and the roll 3 is accelerated until its peripheral speed corresponds approximately with the speed of the web 2 which is passing through the machine. The peripheral speed of the roll and the speed of the web are compared with the aid of conventional measuring instruments driven e.g. by means of wheels bearing aginst the roll 3 and the web 2 (not shown in the drawing). The speed of web 2 which passes through the machine will however vary synchronously with the rotation of roll 3 since the roller 25 moves radially as controlled by cam disc 14, as a result of which the relative speed of the web 2 is alternately increased and decreased. For this reason more accurate speed of web 2 can only take place during a certain part of each revolution of roll 3. Since during this part of each roll revolution (maxiumum 1/2 revolution) the speed of web 2 corresponds with and is equal to the speed of the roll 3, the positional relationship between the pattern or decoration markings on the roll 3 on the web 2 which passes through the machine, respectively, will also be substantially uniform, and with the aid of photoelectric cells the repeated pattern on the roll 3 or web 2, respectively, is scanned regularly, thus enabling fine adjustment of the peripheral speed of the roll to be effected until the relative positions of the markings remain entirely constant. During the remaining part of the splicing process the photoelectric cells provide continuous monitoring and fine adjustment of the speeds. Then, during a number of revolutions (e.g. four), the amount of displacement between the position of the markings on the roll 3 and web 2 is measured for each revolution. Since the speeds are correct such a displacement is entirely due to the unequal spacing between the markings on roll 3 at the end of the latter, and taking the measured value into account the distance X between the center of shaft 18 and the link carrier 20 is very accurately adjusted, until the radial movement of roller 25 is such that that part of the web 2 which is located between the rollers 25 and the first roll 1 is subjected, once for each revolution carried out by roll 3, to a reduction in speed which compensates for the unequal spacing interval between the markings at the end of the web on roll 3 and causes the pattern on the web of material on roll 3 to take up a constant relative position with respect to the pattern of the web 2 which passes through the machine.

Hence the adjustments carried out and described above mean that the pattern on the web of material belonging to roll 3 and the pattern of the web of material 2 passing close to the periphery of roll 3 are displaced in relation to one another, that displacement being kept constant from revolution to revolution. In order to cause the patterns to be in exact register with one another it is now necessary to displace one of the webs by a certain amount. This is effected by lengthening or shortening the path of web 2 by radial displacement of roller 26. This roller is displaced with the aid of driving motor 28 until the patterns are registered with one another. After this final adjustment splicing can take place in the same manner as when webs not provided with a pattern are spliced, i.e. the end of the old roll 1 initiates the start of the splicing proccess automatically, and when the splicing is completed and the web of material begins to be unwound from roll 3, web 2 is cut off and both the splicing device 6 and the driving device are returned to the inoperative positions.

After completion of the splicing process the cam disc 14 is stopped with the follower roll 16 at the smallest radius and it is locked in this position in readiness for the next splicing operation.

It is advantageous to automate the setting and control steps in such a way that start up of the rotation of roll 3 engages an atuomatic device which causes coarse setting of the peripheral speed of the roll, adjusts the peripheral speed accurately by comparing the relative pattern positions, adjusts the radial movement of roller 25 in order to bring about the necessary compensation, adjusts roller 26 to cause the webs to run in exact register with one another and effects the splicing and the return of the splicing arrangement and the driving device to inoperative positions.

It is of course possible to make do without roller 26 and to bring about the displacement in another way, for example, by displacing the pivot for lever 24.

The design of cam disc 14 determines the characteristic governing the momentary changes in speed of the paper web 2. In order to enable maintenance of register between patterns the speed of web 2 must correspond with the peripheral speed of roll 3 for part of the work cycle. Since the rotation of cam disc 14 is synchronous with the rotation of roll 3, the web of paper 2 can be operated at the proper corresponding speed for about a half a revolution of roll 3 by designing track 15 of cam disc 14 with a section having a constant rise for about 180°. Before and after this section there must be sections for an acceleration and a retardation of the web and the remaining section completing a full revolution is thus accessible for momentary reduction of the web speed for the compensation movement.

When the arm 24 rocks in a clockwise direction and shortens the path of paper web 2, the speed of the web is to some extent retarded. The web tension is determined by the brake torque of the outgoing roll 1, and when web 2 is retarded a part of this brake torque serves to brake the mass rotating about the center of the roll, as a result of which only the remaining part of the brake torque can be utilized for braking the web during the momentary reduction is speed. In order to avoid unnecessary consumption of the available brake torque by the guide rollers 29 it is advisable to construct them from a light material. It is also possible to reduce the friction between the guide rollers 29 and the web of material 2 to such an extent that the rollers contribute only to some extent to the reduction in speed.

By the invention a method and an arrangement are provided for splicing a web of material passing through the machine and provided with a regular pattern in register with another web of material provided with a corresponding pattern. This has not been possible previously and entails considerable advantages since a printing press or similar machine, to which the web of material is fed, can operate continuously without stopping.

We claim:

1. A method for splicing a first web of material normally moving at a constant speed and having equally spaced indicia thereon to the leading end of a second web of material in roll form and having equally spaced indicia thereon with the same spacing as the indicia on the first web where the first indicia on the leading end of the second web and the last visible indicia on the second web adjacent the leading end thereof do not normally have the same spacing as between contiguous indicia, the first moving web passing adjacent the periphery of the roll of the second web, comprising, rotating the roll of the second web at a speed providing substantially the same peripheral speed as the speed of the first moving web, varying the speed of the first web during a part of each revolution of the roll of the second web to compensate for the uneven spacing between the first indicia and the last visible indicia on the roll of the second web and to provide a synchronized relation between the indicia on the first web and the indicia on the second web during the remaining part of each revolution of the roll of the second web, advancing or retarding the first moving web longitudinally of its length to provide exact registration between the indicia on the first moving web and the indicia on the second web during the remaining part of each revolution of the roll of the second web and finally splicing together the first moving web with the second web while the indicia are in exact registration.

2. A method as claimed in claim 1 wherein the speed of the first web is reduced during a part of each revolution of the roll of the second web to compensate for the uneven spacing between the first indicia and the last visible indicia on the roll of the second web.

3. A method as claimed in claim 1 wherein the speed of the first web is varied during a part of each revolution of the roll of the second web by increasing or decreasing the length of the path followed by the first web.

4. A device for splicing a first web of material normally moving at a constant speed and having equally spaced indicia thereon to the leading end of a second web of material in roll form and having equally spaced indicia thereon with the same spacing as the indicia on the first web where the first indicia on the leading end of the second web and the last visible indicia on the second web, adjacent the leading end thereof, do not normally have the same spacing as between contiguous indicia, the first moving web passing adjacent the periphery of the roll of the second web, comprising means for rotating the roll of the second web at a speed providing substantially the same peripheral speed as the speed of the first moving web, means for varying the speed of the first web during a part of each revolution of the roll of the second web to compensate for the uneven spacing between the first indicia and the last visible indicia on the roll of the second web and to provide a synchronized relation between the indicia on the first web and the indicia on the second web during the remaining part of each revolution of the roll of the second web, means for advancing or retarding the first moving web longitudinally of its length to provide exact registration between the indicia on the first moving web and the indicia on the second web during the remaining part of each revolution of the roll of the second web, and means for splicing together the first moving web with the second web while the indicia are in exact registration.

5. A device as claimed in claim 4 wherein the means for varying the speed of the first web during a part of each revolution of the roll of the second web comprises a radially displaceable roller over which the first web passes and means for displacing said roller synchronously during each revolution of the roll of the second web.

6. A device as claimed in claim 5 wherein said means for displacing said roller comprises a cam disc rotatable in synchronism with the roll of the second web, a cam follower means, and means for adjustably connecting said cam follower means to said displaceable roller for displacing said roller radially to lengthen or shorten the path of the first web for varying its speed.

7. A device as claimed in claim 6 wherein said means for rotating the roll of the second web includes a rotatable shaft operatively connected to the roll of the second web and to said cam disc.

8. A device as claimed in claim 6 wherein said adjustable connecting means includes a link rod adjustably connected at one end to said cam follower means and at the other end to said radially displaceable roller.

9. A device as claimed in claim 5 wherein the means for advancing or retarding the first moving web longitudinally to provide exact registration comprises a second radially movable roller over which the first web passes for increasing or decreasing the length of the path followed by the first web, and means for moving said second roller radially.

* * * * *